United States Patent
Patterson

(10) Patent No.: US 10,070,309 B2
(45) Date of Patent: Sep. 4, 2018

(54) UNAUTHORIZED TRACKING DEVICE DETECTION AND PREVENTION

(71) Applicant: Tile, Inc., San Mateo, CA (US)

(72) Inventor: Wayne Patterson, Burlingame, CA (US)

(73) Assignee: Tile, Inc., San Mateo, CA (US)

( * ) Notice: Subject to any disclaimer, the term of this patent is extended or adjusted under 35 U.S.C. 154(b) by 0 days.

(21) Appl. No.: 15/389,092

(22) Filed: Dec. 22, 2016

(65) Prior Publication Data

US 2018/0184286 A1   Jun. 28, 2018

(51) Int. Cl.
  *H04W 12/02* (2009.01)
  *H04W 4/00* (2018.01)
  *H04W 48/02* (2009.01)
  *H04W 4/12* (2009.01)
  *H04W 64/00* (2009.01)
  *H04W 4/80* (2018.01)

(52) U.S. Cl.
  CPC ........... *H04W 12/02* (2013.01); *H04W 4/12* (2013.01); *H04W 4/80* (2018.02); *H04W 48/02* (2013.01); *H04W 64/00* (2013.01)

(58) Field of Classification Search
  CPC ....... H04W 12/02; H04W 4/008; H04W 4/12; H04W 48/02; H04W 64/00
  USPC ....................................................... 455/411
  See application file for complete search history.

(56) References Cited

U.S. PATENT DOCUMENTS

| 7,974,602 B2 * | 7/2011 | Agrawal | H04M 3/2218 455/403 |
| 2012/0268239 A1 * | 10/2012 | Ljung | H04W 4/028 340/5.8 |
| 2014/0154986 A1 * | 6/2014 | Lee | H04B 7/26 455/41.2 |
| 2015/0067785 A1 * | 3/2015 | Donnellan | H04W 12/06 726/4 |

\* cited by examiner

*Primary Examiner* — Kamran Afshar
*Assistant Examiner* — Nicole Louis-Fils
(74) *Attorney, Agent, or Firm* — Fenwick & West LLP

(57) ABSTRACT

The detection and prevention of unauthorized tracking devices is described herein. For example, a mobile device may be configured to detect nearby wireless devices. The communication signal between a detected wireless device and the mobile device may be tracked over time, and used to programmatically determine the likelihood that the detected wireless device is an unknown tracking device. The user of the mobile device may be given a notification and related data when a suspicious device is identified, and the user may choose to identify the unknown tracking device as an authorized tracking device or an unauthorized tracking device. When a detected wireless device is identified as an unauthorized tracking device, various remedial actions may be performed by a user and/or a central tracking system. In one example, the central tracking system remotely deactivates the unauthorized tracking device.

18 Claims, 8 Drawing Sheets

UNAUTHORIZED TRACKING DEVICE DETECTION AND PREVENTION

BACKGROUND

This disclosure relates generally to tracking devices, and more specifically, to preserving a user's data security and privacy in a tracking device environment.

Electronic tracking devices track the location of people and/or objects. For example, a user can use GPS technology to track a device remotely and determine a location of a user of the device. In another example, a user can attach a tracking device to an important object, such as keys or a wallet, and use the features of the tracking device to more quickly locate the object, (e.g., if it becomes lost).

However, tracking devices and corresponding systems suffer from one or more disadvantages. If a tracking device is attached to a possession of a user without the user's permission, location and/or movement of the user can be tracked without authorization from the user. Accordingly, there is a need to prevent the unauthorized tracking of the user in such circumstances, thereby protecting the privacy of the user.

SUMMARY

Techniques for detecting and preventing unauthorized tracking devices are discussed herein. For example, a mobile device may be configured to detect nearby wireless devices. The presence of a wireless device may be tracked by a mobile device based on communications detected from the wireless device over time, and can be used to programmatically determine the likelihood that the nearby wireless device is an unauthorized tracking device. The user of the mobile device may be given a notification and related data when a suspicious device is identified, and the user may choose to register the device for authorization, or flag the device as unauthorized. When a wireless device is identified as an unauthorized tracking device, various remedial actions may be performed by the user and/or a remote tracking system. In one example, the tracking system is configured to remotely deactivate the unauthorized tracking device.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Environment Overview

Embodiments described herein detail functionality associated with a tracking device. A user can attach a tracking device to or enclose the tracking device within an object, such as a wallet, keys, a car, a bike, a pet, or any other object that the user wants to track. The user can then use a mobile device (e.g., by way of a software application installed on the mobile device) or other device or service to track the tracking device and corresponding object. For example, the mobile device can perform a local search for a tracking device attached to a near-by object. However, in situations where the user is unable to locate the tracking device using their own mobile device (e.g., if the tracking device is beyond a distance within which the mobile device and the tracking device can communicate), the user can leverage the capabilities of a community of users of a tracking device system.

In particular, a tracking system (also referred to herein as a "cloud server" or simply "server") can maintain user profiles associated with a plurality of users of the tracking device system. The tracking system can associate each user within the system with one or more tracking devices associated the user (e.g., tracking devices that the user has purchased and is using to track objects owned by the user). If the user's object becomes lost or stolen, the user can send an indication that the tracking device is lost to the tracking system, which is in communication with one or more mobile devices associated with the community of users in communication with the system. The tracking system can set a flag indicating the tracking device is lost. When one of a community of mobile devices that are scanning for nearby tracking devices and providing updated locations to the tracking system identifies a flagged tracking device, the tracking system can associate the received location with the flagged tracking device, and relay the location to a user of the tracking device, thereby enabling the user to locate the lost tracking device.

Figure 1:
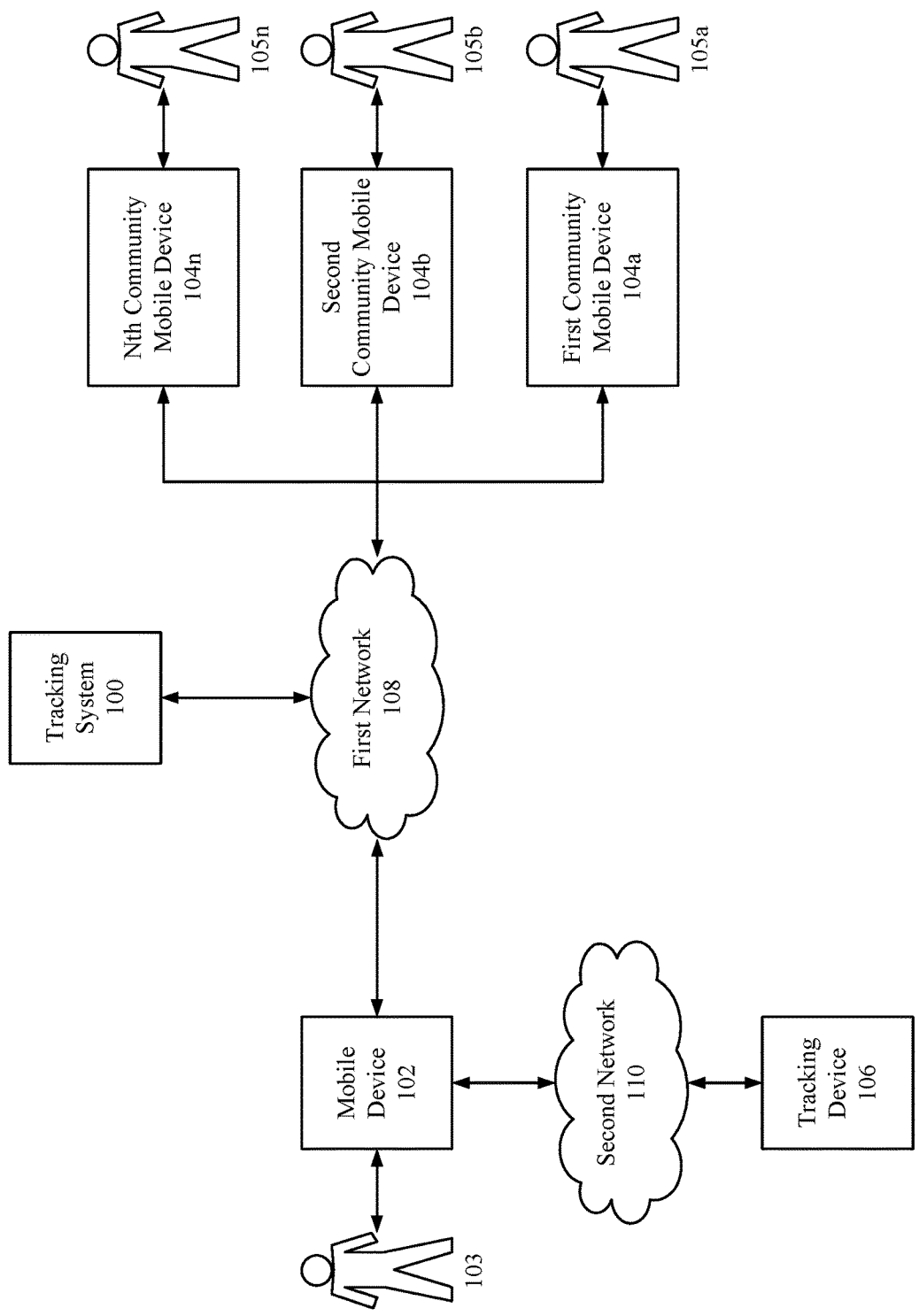
FIG. 1 illustrates an example tracking system environment in which a tracking device can operate, according to one embodiment.

FIG. 1 illustrates an example tracking system environment in which a tracking device can operate, according to one embodiment. The environment of FIG. 1 includes a tracking system 100 communicatively coupled to a mobile device 102 associated with the user 103 via a first network 108. The tracking system 100 is also communicatively coupled to a plurality of community mobile devices 104a through 104n (collectively referred to herein as "community mobile devices 104") associated with a plurality of users 105a through 105n of the tracking system 100 (collectively referred to herein as "community users 105") via the first network 108. As will be explained in more detail below, the tracking system 100 can allow the user 103 to manage and/or locate a tracking device 106 associated with the user 103. In some embodiments, the tracking system 100 leverages the capabilities of community mobile devices 104 to locate the tracking device 106 if the location of the tracking device is unknown to the user 103 and beyond the capabilities of mobile device 102 to track. In some configurations, the user 103 may own and register multiple tracking devices 106. Although FIG. 1 illustrates a particular arrangement of the tracking system 100, mobile device 102, community mobile devices 104, and tracking device 106, various additional arrangements are possible.

In some configurations, the user 103 may be part of the community of users 105. Further, one or more users 105 may own and register one or more tracking devices 106. Thus, any one of the users within the community of users 105 can communicate with tracking system 100 and leverage the capabilities of the community of users 105 in addition to the user 103 to locate a tracking device 106 that has been lost.

The tracking system 100, mobile device 102, and plurality of community mobile devices 104 may communicate using any communication platforms and technologies suitable for transporting data and/or communication signals, including known communication technologies, devices, media, and protocols supportive of remote data communications.

In certain embodiments, the tracking system 100, mobile device 102, and community mobile devices 104 may communicate via a network 108, which may include one or more networks, including, but not limited to, wireless networks (e.g., wireless communication networks), mobile telephone networks (e.g., cellular telephone networks), closed communication networks, open communication networks, satellite networks, navigation networks, broadband networks, narrowband networks, the Internet, local area networks, and any other networks capable of carrying data and/or communications signals between the tracking system 100, mobile device 102, and community mobile devices 104. The mobile device 102 and community of mobile devices 104 may also be in communication with a tracking device 106 via a second network 110. The second network 110 may be a similar or different type of network as the first network 108. In some embodiments, the second network 110 comprises a wireless network with a limited communication range, such as a Bluetooth or Bluetooth Low Energy (BLE) wireless network. In some configurations, the second network 110 is a point-to-point network including the tracking device 106 and one or more mobile devices that fall within a proximity of the tracking device 106. In such embodiments, the mobile device 102 and community mobile devices 104 may only be able to communicate with the tracking device 106 if they are within a close proximity to the tracking device, though in other embodiments, the tracking device can use long-distance communication functionality (for instance, a GSM transceiver) to communicate with either a mobile device 102/104 or the tracking system 100 at any distance. In some configurations, the mobile device 102 and one or more community mobile devices 104 may each be associated with multiple tracking devices associated with various users.

As mentioned above, FIG. 1 illustrates the mobile device 102 associated with the user 103. The mobile device 102 can be configured to perform one or more functions described herein with respect to locating tracking devices (e.g., tracking device 106). For example, the mobile device 102 can receive input from the user 103 representative of information about the user 103 and information about a tracking device 106. The mobile device 102 may then provide the received user information, tracking device information, and/or information about the mobile device 102 to the tracking system 100. Accordingly, the tracking system 100 is able to associate the mobile device 102, the user 103, and/or the tracking device 106 with one another. In some embodiments, the mobile device 102 can communicate with the tracking device 106 and provide information regarding the location of the tracking device to the user 103. For example, the mobile device 102 can detect a communication signal from the tracking device 106 (e.g., by way of second network 110) as well as a strength of the communication signal or other measure of proximity to determine an approximate distance between the mobile device 102 and the tracking device 106. The mobile device 102 can then provide this information to the user 103 (e.g., by way of one or more graphical user interfaces) to assist the user 103 to locate the tracking device 106. Accordingly, the user 103 can use the mobile device 102 to track and locate the tracking device 106 and a corresponding object associated with the tracking device 106. If the mobile device 102 is located beyond the immediate range of communication with the tracking device 106 (e.g., beyond the second network 110), the mobile device 102 can be configured to send an indication that a tracking device 106 is lost to the tracking system 100, requesting assistance in finding the tracking device. The mobile device 102 can send an indication of a lost device in response to a command from the user 103. For example, once the user 103 has determined that the tracking device 106 is lost, the user can provide user input to the mobile device 102 (e.g., by way of a graphical user interface), requesting that the mobile device 102 send an indication that the tracking device 106 is lost to the tracking system 100. In some examples, the lost indication can include information identifying the user 103 (e.g., name, username, authentication information), information associated with the mobile device 102 (e.g., a mobile phone number), information associated with the tracking device (e.g., a unique tracking device identifier), or a location of the user (e.g., a GPS location of the mobile device 102 at the time the request is sent).

The tracking system 100 can be configured to provide a number of features and services associated with the tracking and management of a plurality of tracking devices and/or users associated with the tracking devices. For example, the tracking system 100 can manage information and/or user profiles associated with user 103 and community users 105. In particular, the tracking system 100 can manage information associated with the tracking device 106 and/or other tracking devices associated with the user 103 and/or the community users 105.

As mentioned above, the tracking system 100 can receive an indication that the tracking device 106 is lost from the mobile device 102. The tracking system 100 can then process the indication in order to help the user 103 find the tracking device 106. For example, the tracking system 100 can leverage the capabilities of the community mobile devices 104 to help find the tracking device 106. In particular, the tracking system 100 may set a flag for a tracking device 106 to indicate that the tracking device 106 lost and monitor communications received from the community mobile devices 104 indicating the location of one or more tracking devices 106 within proximity of the community mobile devices 104. The tracking system 100 can determine whether a specific location is associated with the lost tracking device 106 and provide any location updates associated with the tracking device 106 to the mobile device 102. In one example, the tracking system may receive constant updates of tracking device 106 locations regardless of whether a tracking device 106 is lost and provide a most recent updated location of the tracking device 106 in response to receiving an indication that the tracking device 106 is lost.

In some configurations, the tracking system 100 can send a location request associated with the tracking device 106 to each of the community mobile devices 104. The location request can include any instructions and/or information necessary for the community mobile devices 106 to find the tracking device 102. For example, the location request can include a unique identifier associated with the tracking device 106 that can be used by the community mobile devices 104 to identify the tracking device 106. Accordingly, if one of the community mobile devices 104 detects a communication from the tracking device 106 (e.g., if the community mobile device 104 is within range or moves within range of the communication capabilities of the tracking device 106 and receives a communication signal from the tracking device 106 including or associated with the unique identifier associated with the tracking device 106), the community mobile device 104 can inform the tracking system 100. Using the information received from the community mobile devices 104, the tracking system 100 can inform the user (e.g., by way of the mobile device 102) of a potential location of the tracking device 106.

As shown in FIG. 1 and as mentioned above, the tracking system 100 can communicate with a plurality of community mobile devices 104 associated with corresponding community users 105. For example, an implementation may include a first community mobile device 104*a* associated with a first community user 105*a*, a second community mobile device 104*b* associated with a second community user 105*b*, and additional communication mobile devices associated with additional community users up to an nth community mobile device 104*n* associated with an nth community user 105*n*. The community mobile devices 104 may also include functionality that enables each community mobile device 104 to identify a tracking device 106 within a proximity or communicable range of the community mobile device 104. In one example, a first community mobile device 104*a* within proximity of a tracking device 106 can communicate with the tracking device 106, identify the tracking device 106 (e.g., using a unique identifier associated with the tracking device 106), and/or detect a location associated with the tracking device 106 (e.g., a location of the first mobile community device 104*a* at the time of the communication with the tracking device 106). This information can be used to provide updated locations and/or respond to a location request from the tracking system 100 regarding the tracking device 106. In some embodiments, the steps performed by the first community mobile device 104*a* can be hidden from the first community user 105*a*. Accordingly, the first community mobile device 104*a* can assist in locating the tracking device 106 without bother and without the knowledge of the first community user 105*a*.

As mentioned above, the tracking system 100 can assist a user 103 in locating a tracking device 106. The tracking device may be a chip, tile, tag, or other device for housing circuitry and that may be attached to or enclosed within an object such as a wallet, keys, purse, car, or other object that the user 103 may track. Additionally, the tracking device 106 may include a speaker for emitting a sound and/or a transmitter for broadcasting a beacon. In one configuration, the tracking device 106 may periodically transmit a beacon signal that may be detected using a nearby mobile device 102 and/or community mobile device 104. In some configurations, the tracking device 106 broadcasts a beacon at regular intervals (e.g., one second intervals) that may be detected from a nearby mobile device (e.g., community mobile device 104). The strength of the signal emitted from the tracking device 106 may be used to determine a degree of proximity to the mobile device 102 or community mobile device 104 that detects the signal. For example, a higher strength signal would indicate a close proximity between the tracking device 106 and the mobile device 102 and a lower strength signal would indicate a more remote proximity between the tracking device 106 and the mobile device 102, though in some embodiments, the tracking device 106 can intentionally vary the transmission strength of the beacon signal. In some cases, the strength of signal or absence of a signal may be used to indicate that a tracking device 106 is lost.

System Overview

Figure 2:
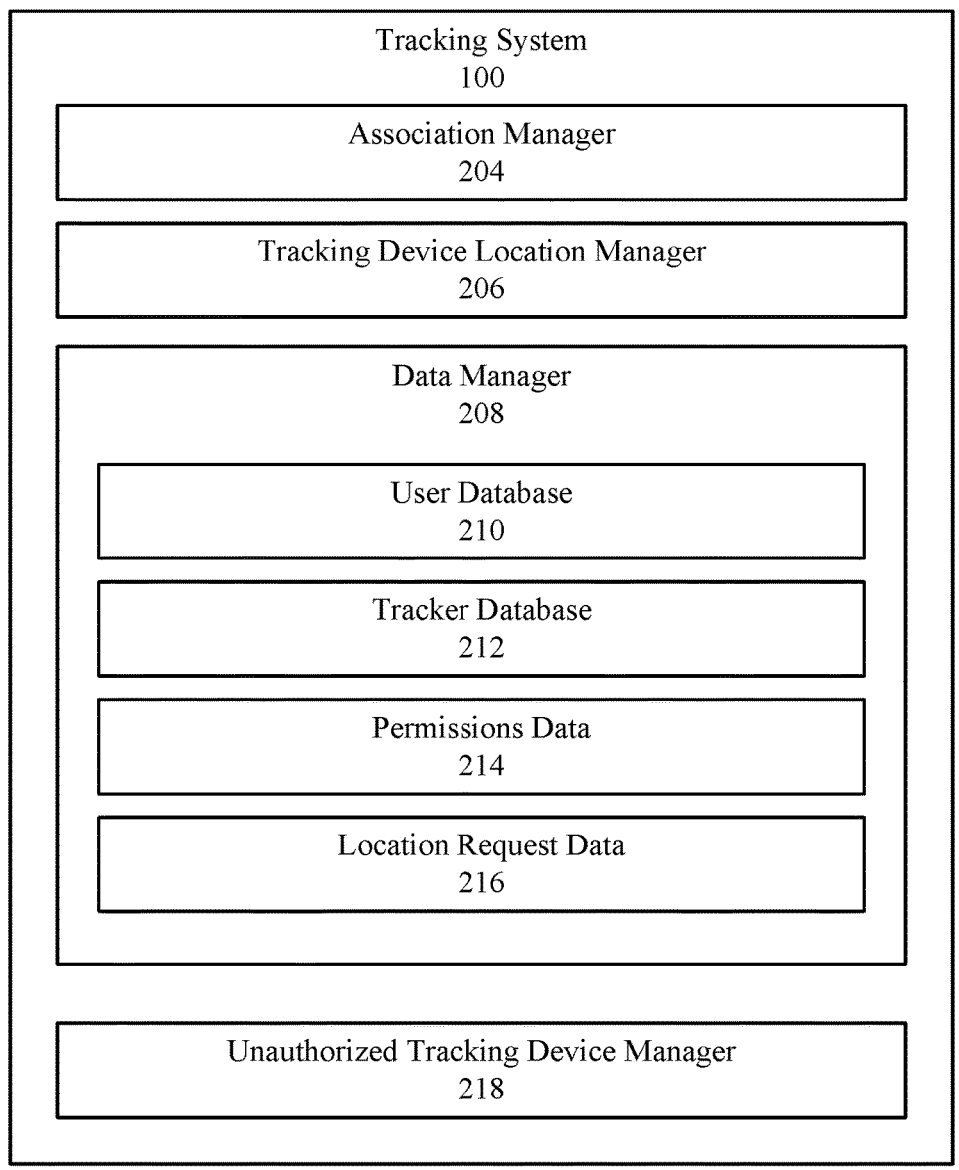
FIG. 2 illustrates an example tracking system for use in a tracking system environment, according to one embodiment.

FIG. 2 illustrates an example tracking system for use in a tracking system environment, according to one embodiment. As shown, the tracking system 100 may include, but is not limited to, an association manager 204, a tracking device location manager 206, a data manager 208, and an unauthorized tracking device manager, each of which may be in communication with one another using any suitable communication technologies. It will be recognized that although managers 204-208 are shown to be separate in FIG. 2, any of the managers 204-208 may be combined into fewer managers, such as into a single manager, or divided into more managers as may serve a particular embodiment.

The association manager 204 may be configured to receive, transmit, obtain, and/or update information about a user 103 and/or information about one or more specific tracking devices (e.g., tracking device 106). In some configurations, the association manager 204 may associate information associated with a user 103 with information associated with a tracking device 106. For example, user information and tracking information may be obtained by way of a mobile device 102, and the association manager 204 may be used to link the user information and tracking information. The association between user 103 and tracking device 106 may be used for authentication purposes, or for storing user information, tracking device information, permissions, or other information about a user 103 and/or tracking device 106 in a database.

In some embodiments, the association manager 204 may be used to facilitate identification of authorized and unauthorized devices from one or more wireless devices connected with the mobile device 102. For example, the association manager 204 may be configured to access authorized device identifiers defining a set of authorized devices. The authorized devices may define authorized tracking devices, such as owner tracking devices associated with the user of the mobile device, shared tracking devices associated with a connected user of the user of the mobile device, or other authorized (e.g., non-tracking) wireless devices (e.g., a peripheral device). Each authorized devices may be associated with a device identifier. A detected wireless device that fails to include an authorized device identifier may be identified as an unauthorized device. In some embodiments, a list of unauthorized device identifiers may also be stored and referenced to determine whether detected wireless device is an authorized or unauthorized device.

The tracking system 100 also includes a tracking device location manager 206. The tracking device location manager 206 may receive and process an indication that the tracking device 106 is lost from a mobile device (e.g., mobile device 102 or community mobile devices 104). For example, the tracking system 100 may receive a lost indication from a mobile device 102 indicating that the tracking device 106 is lost. The tracking device location manager 206 may set a flag on a database (e.g., tracker database 212) indicating that the tracking device 106 is lost. The tracking device location manager 206 may also query a database to determine tracking information corresponding to the associated user 103 and/or tracking device 106. The tracking system 100 may obtain tracking device information and provide the tracking device information or other information associated with the tracking device 106 to a plurality of community mobile devices 104 to be on alert for the lost or unavailable tracking device 106.

The tracking device location manager 206 may also receive a location from one or more community mobile devices 104 that detect the tracking device 106, for instance in response to the community mobile device receiving a beacon signal transmitted by the tracking device 106, without the tracking device 106 having been previously marked as lost. In such embodiments, a user corresponding to the mobile device 102 can request a most recent location associated with the tracking device from the tracking system 100, and the location manager 206 can provide the location received from the community mobile device for display by the mobile device 102. In some embodiments, the location manager 206 provides the location of the tracking device 106 received from a community mobile device either automatically (for instance if the tracking device 106 is marked as lost) or at the request of a user of the mobile device 102 (for instance, via an application on the mobile device 102). The location manager 206 can provide a location of a tracking device 106 to a mobile device 102 via a text message, push notification, application notification, automated voice message, or any other suitable form of communication.

The tracking device location manager 206 may further manage providing indications about whether a tracking device 106 is lost or not lost. For example, as discussed above, the tracking device location manager 206 may provide a location request to the community of mobile devices 104 indicating that a tracking device 106 is lost. Additionally, upon location of the tracking device 106 by the user 103 or by one of the community of users 105, the tracking device location manager 206 may provide an indication to the user 103, community user 105, or tracking system 100 that the tracking device 106 has been found, thus removing any flags associated with a tracking device and/or canceling any location request previously provided to the community of users 105. For example, where a user 103 sends an indication that the tracking device 106 is lost to the tracking system 100 and later finds the tracking device 106, the mobile device 102 may provide an indication to the tracking system 100 that the tracking device 106 has been found. In response, the tracking device location manager 206 may remove a flag indicating that the tracking device 106 is lost and/or provide an updated indication to the community of users 105 that the tracking device 106 has been found, thus canceling any instructions associated with the previously provided location request. In some configurations, the notification that the tracking device 106 has been found may be provided automatically upon the mobile device 102 detecting the tracking device 106 within a proximity of the mobile device 102. Alternatively, the notification that the tracking device 106 has been found may be provided by the user 103 via user input on the mobile device 102. In another example, a known user (e.g., a friend or family member) with whom the tracking device 106 has been shared may provide an indication that the tracking device 106 has been found.

The tracking system 100 additionally includes a data manager 208. The data manager 208 may store and manage information associated with users, mobile devices, tracking devices, permissions, location requests, and other data that may be stored and/or maintained in a database related to performing location services of tracking devices. As shown, the data manager 208 may include, but is not limited to, a user database 210, a tracker database 212, permissions data 214, and location request data 216. It will be recognized that although databases and data within the data manager 208 are shown to be separate in FIG. 2, any of the user database 210, tracker database 212, permissions data 214, and location request data 216 may be combined in a single database or manager, or divided into more databases or managers as may serve a particular embodiment.

The data manager 208 may include the user database 210. The user database 210 may be used to store data related to various users. For example, the user database 210 may include data about the user 103 as well as data about each user 105 in a community of users 105. The community of users 105 may include any user that has provided user information to the tracking system 100 via a mobile device 102, 104 or other electronic device. The user information may be associated with one or more respective tracking devices 106, or may be stored without an association to a particular tracking device. For example, a community user 105 may provide user information and permit performance of tracking functions on the community mobile device 104 without owning or being associated with a tracking device 106. The user database 210 may also include information about one or more mobile devices or other electronic devices associated with a particular user.

The user database 210 may also include information defining shared tracking devices. A shared tracking device refers to a tracking device that is owned by a different user, but is an authorized device for tracking the user. For example, the user database 210 may associate the user with another user (e.g., a friend, connection, etc.) such that a tracking device owned by the other is identified as a shared tracking device for the user.

The data manager 208 may also include a tracker database 212. The tracker database 212 may be used to store data related to tracking devices. For example, the tracker database 212 may include tracking data for any tracking device 106 that has been registered or otherwise authorized with the tracking system 100. Tracking data may include unique tracker identifications (IDs) or "device identifiers" associated with individual tracking devices 106. Tracker IDs may be associated with a respective user 103. Tracker IDs may also be associated with multiple users. Additionally, the tracker database 212 may include any flags or other indications associated with whether a specific tracking device 106 has been indicated as lost and whether any incoming communications with regard to that tracking device 106 should be processed based on the presence of a flag associated with the tracking device 106. In some embodiments, the tracker database 212 may further include an authorized tracking device flag indicating whether a specific tracking device 106 has been identified as an unauthorized tracking device for a user.

The data manager 208 may further include permissions data 214 and location request data 216. Permissions data 214 may include levels of permissions associated with a particular user 103 and/or tracking device 106. For example, permissions data 214 may include additional users that have been indicated as sharing a tracking device 106, or who have been given permission to locate or receive a location of a tracking device 106. Location request data 216 may include information related to a location request or a lost indication received from the user 103 via a mobile device 102.

The tracking system 100 further includes an unauthorized device manager 218. The unauthorized device manager 218 may be configured to perform the functionalities discussed herein with respect to identifying unauthorized tracking devices from wireless devices detected by a mobile device 102, and performing suitable remedial actions. The unauthorized device manager 218 may be further configured to remotely disable an authorized tracking device if possible, such as when the unauthorized tracking device is a tracking device managed by the tracking system 100 (or a "managed tracking device," as used herein). In another example, if the unauthorized tracking device is not a managed tracking device or otherwise cannot be controlled by the tracking system 100, then a notification may be sent to a (e.g., third party) system associated with the unauthorized tracking device.

Figure 3:
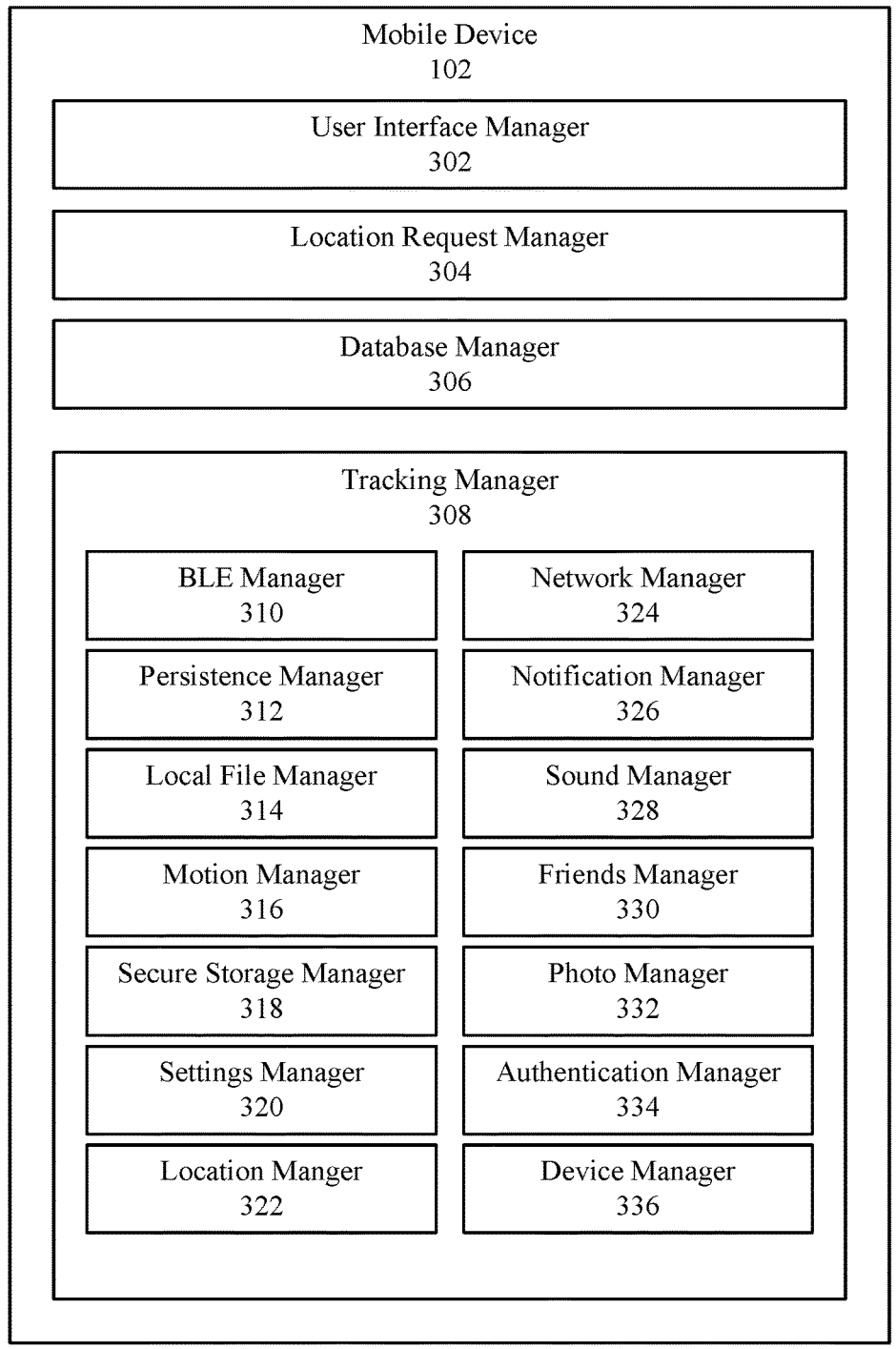
FIG. 3 illustrates an example user mobile device for use in a tracking system environment, according to one embodiment.

FIG. 3 illustrates an example user mobile device for use in a tracking system environment, according to one embodiment. As shown, the mobile device 102 may include, but is not limited to, a user interface manager 302, a location request manager 304, a database manager 306, and a tracking manager 308, each of which may be in communication with one another using any suitable communication technologies. It will be recognized that although managers 302-308 are shown to be separate in FIG. 3, any of the managers 302-308 may be combined into fewer managers, such as into a single manager, or divided into more managers as may serve a particular embodiment.

As will be explained in more detail below, the mobile device 102 includes the user interface manager 302. The user interface manager 302 may facilitate providing the user 103 access to data on a tracking system 100 and/or providing data to the tracking system 100. Further, the user interface manager 302 provides a user interface by which the user 103 may communicate with tracking system 100 and/or tracking device 106 via mobile device 102.

The mobile device 102 may also include a location request manager 304. The location request manager 304 may receive and process a request input to the mobile device 102 to send an indication that a tracking device 106 is lost to a tracking system 100. For example, the user 103 may provide an indication that a tracking device 106 is lost, unreachable, or otherwise unavailable from the mobile device 102 via the user interface manager 302, and the location request manager 304 may process the lost indication and provide any necessary data to the tracking system 100 for processing and relaying a location request to other users 105 over a network 108. In some configurations, an indication that a tracking device 106 is lost is provided via user input. Alternatively, the indication may be transmitted automatically in response to the mobile device 102 determining that a tracking device 106 is lost.

In addition, the location request manager 304 can request a location of the tracking device 106 without the tracking device 106 being identified as lost. For instance, a user can access a tracking device location feature of an application running on the mobile device 102 (for example, via the user interface manager 302), and the location request manager 304 can request a most recent location of the tracking device 106 from the tracking system 100. The location request manager 304 can receive the most recent location from the tracking system 100, and can display the most recent location via the user interface manager 302.

The mobile device 102 may also include a database manager 306. The database manager 306 may maintain data related to the user 103, tracking device 106, permissions, or other data that may be used for locating a tracking device 106 and/or providing a request to a tracking system 100 for locating one or more tracking devices 106 associated with the user 103. Further, the database manager 306 may maintain any information that may be accessed using any other manager on the mobile device 102.

The mobile device 102 may further include a tracking manager 308. The tracking manager 308 may also a tracking application (e.g., a software application) for communicating with and locating a tracking device 106 associated with the user 103. The tracking manager 308 may be configured to communicate with the unauthorized tracking device manager 218 of the tracking system 100 to provide the functionality discussed herein with respect to unauthorized device detection and handling. For example, the tracking manager 308 may be configured to receive notifications regarding unauthorized devices, and facilitate user definition of authorized devices.

The tracking manager 308 may be one configuration of a tracking application installed on the mobile device 102 that provides the functionality for locating a tracking device 106 and/or requesting location of a tracking device 106 using a tracking system 100 and/or a plurality of community mobile devices 104. As shown, the tracking manager 308 may include, but is not limited to, a Bluetooth Low Energy (BLE) manager 310, a persistence manager 312, a local files manager 314, a motion manager 316, a secure storage manager 318, a settings manager 320, a location manager 322, a network manager 324, a notification manager 326, a sound manager 328, a friends manager 330, a photo manager 332, an authentication manager 334, and a device manager 336. Thus, the tracking manager 308 may perform any of the functions associated with managers 310-338, described in additional detail below.

The BLE manager 310 may be used to manage communication with one or more tracking devices 106. The persistence manager 312 may be used to store logical schema information that is relevant to the tracking manager 308. The local files manager 314 may be responsible for managing all files that are input or output from the mobile device 102. The motion manager 316 may be responsible for all motion management required by the tracking manager 308. The secure storage manager may be responsible for storage of secure data, including information such as passwords and private data that would be accessed through this sub-system. The settings manager 320 may be responsible for managing settings used by the tracking manager 308. Such settings may be user controlled (e.g., user settings) or defined by the tracking manager 308 for internal use (e.g., application settings) by a mobile device 102 and/or the tracking system 100. The location manager 322 may be responsible for location tracking done by the tracking manager 308. For example, the location manager 322 may manage access to the location services of the mobile device 102 and works in conjunction with other managers to persist data. The network manager 324 may be responsible for all Internet communications from the tracking manager 308. For example, the network manager 324 may mediate all Internet API calls for the tracking manager 308. The notification manager 326 may be responsible for managing local and push notifications required by the tracking manager 308. The sound manager 328 may be responsible for playback of audio cues by the tracking manager 308. The friends manager 330 may be responsible for managing access to contacts and the user's social graph. The photo manager 332 may be responsible for capturing and managing photos used by the tracking manager 308. The authentication manager 334 may be responsible for handling the authentication (e.g., sign in or login) of users. The authentication manager 334 may also include registration (e.g., sign up) functionality. The authentication manager 334 further coordinates with other managers to achieve registration functionality. The device manager 336 may be responsible for managing the devices discovered by the tracking manager 308. The device manager 336 may further store and/or maintain the logic for algorithms related to device discovery and update.

Figure 4:
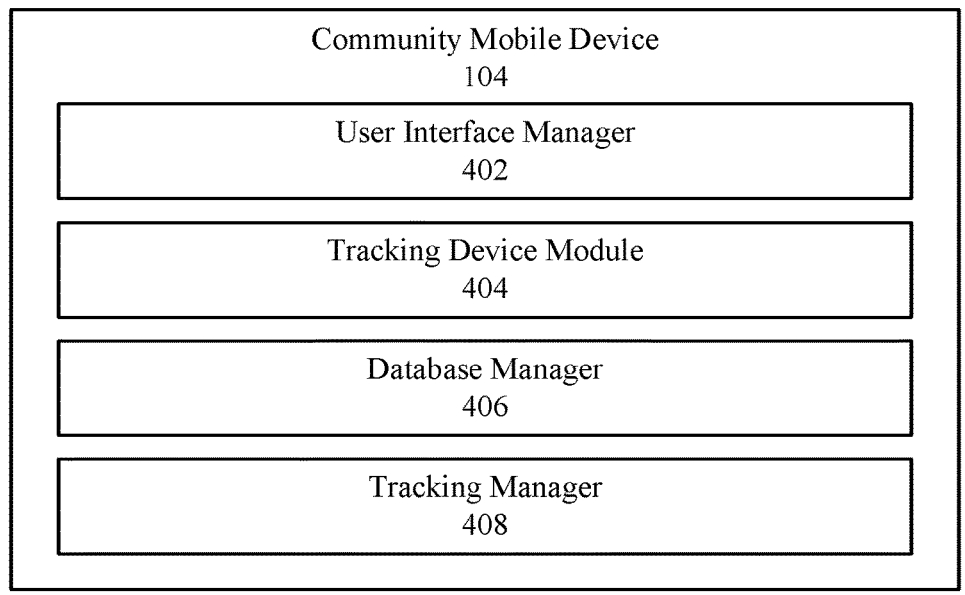
FIG. 4 illustrates an example community mobile device for use in a tracking system environment, according to one embodiment.

FIG. 4 illustrates an example community mobile device for use in a tracking system environment, according to one embodiment. As shown, the community mobile device 104 may include, but is not limited to, a user interface manager 402, a tracking device manager 404, a database manager 406, and a tracking manager 408, each of which may be in communication with one another using any suitable communication technologies. The user interface manager 402, database manager 406, and tracking manager 408 illustrated in FIG. 4 may include similar features and functionality as the user interface manager 302, database manager 306, and tracking manager 308 described above in connection with FIG. 3. It will be recognized that although managers 402-408 are shown to be separate in FIG. 4, any of the managers 402-408 may be combined into fewer managers, such as into a single manager, or divided into more managers as may serve a particular embodiment.

The community mobile device 104 may include a tracking device manager 404. The tracking device manager 404 may facilitate scanning for nearby tracking devices 106. In some configurations, the tracking device manager 404 can continuously or periodically scan (e.g., once per second) for nearby tracking devices 106. The tracking device manager 404 may determine whether to provide an updated location of the nearby tracking device 106 to the tracking system 100. In some configurations, the tracking device manager 404 provides a location of a nearby tracking device 106 automatically. Alternatively, the tracking device manager 404 may determine whether the location of the tracking device 106 has been recently updated, and may determine whether to provide an updated location based on the last time a location of the tracking device 106 has been updated (e.g., by the community mobile device 104). For example, where the community mobile device 104 has provided a recent update of the location of a tracking device 106, the tracking device manager 404 may decide to wait a predetermined period of time (e.g., 5 minutes) before providing an updated location of the same tracking device 106.

In one configuration, the tracking device manager 404 may receive and process a location request or other information relayed to the community mobile device 104 by the tracking system 100. For example, the tracking device manager 404 may receive an indication of a tracking device 106 that has been indicated as lost, and provide a location of the tracking device 106 if it comes within proximity of the community mobile device 104. In some configurations, the community mobile device 104 is constantly scanning nearby areas to determine if there is a tracking device 106 within a proximity of the community mobile device 104. Therefore, where a tracking device 106 that matches information provided by the tracking system 100 (e.g., from the location request) comes within proximity of the community mobile device 104, the tracking device manager 404 may generate and transmit a response to the location request to the tracking system 100, which may be provided to the user 103 associated with the tracking device 106. Further, generating and transmitting the response to the tracking request may be conditioned on the status of the tracking device 106 being flagged as lost by the mobile device 102 and/or the tracking system 100.

The tracking device manager 404 may additionally provide other information to the tracking system 100 in response to receiving the tracking request. For example, in addition to providing a location of the community mobile device 104, the tracking device manager may provide a signal strength associated with the location to indicate a level of proximity to the location of the community mobile device 104 provided to the user 103. For example, if a signal strength of a communication signal is high, the location provided to the user 103 is likely to be more accurate than a location accompanied by a low signal strength. This may provide additional information that the user 103 may find useful in determining the precise location of tracking device 106.

As described above, the tracking device manager 404 may determine whether to send a location within the proximity of the tracking device 106 to the tracking system 100. The determination of whether to send a location to the tracking system 100 may be based on a variety of factors. For example, a tracking device manager 404 may determine to send a location of the tracking device 106 to a tracking system 100 based on whether the detected tracking device 106 has been indicated as lost or if a tracking request has been provided to the community mobile device 104 for the particular tracking device 106. In some configurations, the community mobile device 104 may send an update of a location of a tracking device 106 even if the tracking device 106 is not associated with a current tracking request or if the tracking device 106 is not indicated as lost. For example, where the location of a tracking device 106 has not been updated for a predetermined period of time, the community mobile device 104 may provide an update of a tracking device location to the tracking system 100, regardless of whether a tracking request has been received.

In some configurations, the community mobile device 104 may include additional features. For example, the community mobile device 104 may allow a tracking system 100 to snap and download a photo using photo functionality of the community mobile device 104. In some configurations, this may be an opt-in feature by which a community user 105 permits a tracking system 100 to take a snap-shot and possibly provide a visual image of an area within a proximity of the tracking device 106.

Figure 5:
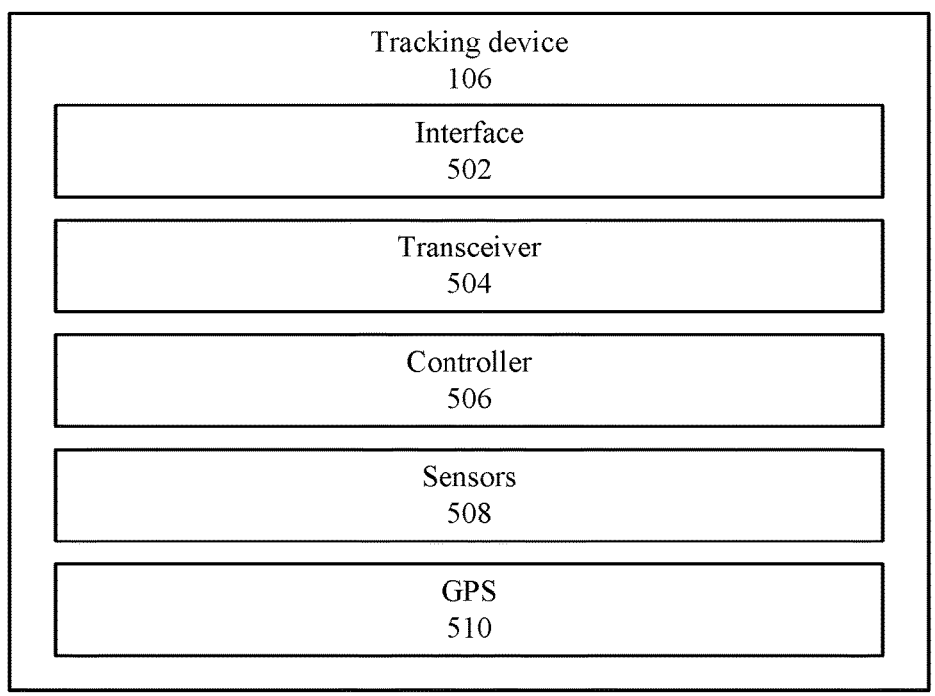
FIG. 5 illustrates an example tracking device for use in a tracking system environment, according to one embodiment.

FIG. 5 illustrates an example tracking device for use in a tracking system environment, according to one embodiment. The tracking device 106 of FIG. 5 includes an interface 502, a transceiver 504, a controller 506, one or more sensors 508, and a GPS unit 510. The transceiver 504 is a hardware circuit capable of both transmitting and receiving signals. It should be noted that in other embodiments, the tracking device 106 includes fewer, additional, or different components than those illustrated in FIG. 5.

The interface 502 provides a communicative interface between the tracking device 106 and one or more other devices, such as a mobile device 102. For instance, the interface 502 can instruct the transceiver 504 to output beacon signals as described above (for example, periodically or in response to a triggering event, such as a detected movement of the tracking device 106). The interface 502 can, in response to the receiving of signals by the transceiver 504 from, for instance, the mobile device 102, manage a pairing protocol to establish a communicative connection between the tracking device 106 and the mobile device 102. As noted above, the pairing protocol can be a BLE connection, though in other embodiments, the interface 502 can manage other suitable wireless connection protocols (such as WiFi, Global System for Mobile Communications or GSM, and the like).

The controller 506 is a hardware chip that configures the tracking device 106 to perform one or more functions or to operate in one or operating modes or states. For instance, the controller 506 can configure the interval at which the transceiver broadcasts beacon signals, can authorize or prevent particular devices from pairing with the tracking device 106 based on information received from the devices and permissions stored at the tracking device, can increase or decrease the transmission strength of signals broadcasted by the transceiver, can configure the interface to emit a ringtone or flash an LED light, can enable or disable various tracking device sensors, can enable or disable a tracking device GPS unit, can enable or disable communicative functionality of the tracking device 106 (such as a GSM transmitter and receiving), can configure the tracking device into a sleep mode or awake mode, can configure the tracking device into a power saving mode, and the like. The controller 506 can configure the tracking device to perform functions or to operate in a particular operating mode based on information or signals received from a device paired with or attempting to pair with the tracking device 106, based on an operating state or connection state of the tracking device 106, based on user-selected settings, based on information stored at the tracking device 106, based on a detected location of the tracking device 106, based on historical behavior of the tracking device 106 (such as a previous length of time the tracking device was configured to operate in a particular mode), based on information received from the sensors 508 or the GPS 510, or based on any other suitable criteria.

In some embodiments, the controller 506 may be configured to facilitate remote activation or deactivation of the tracking device 105, such as based on received instructions from the tracking system 100. The tracking system 100 may be configured to communicate activation or deactivation instructions to the tracking device 105 via the mobile device 102. For example, the instruction may be generated by the tracking system 100 when an unauthorized device is identified as an unauthorized tracking device managed by the tracking system 100, then sent to the mobile device 102 via the first network 108, and then to the tracking device 106 via the second network 110. In another example, the instruction may be provided to the tracking device 106 via a community mobile device 104. In another example, the instruction may be provided to the tracking device 106 without traveling through a mobile device 102/104, such as directly through the first network 108.

The sensors 508 can include motion sensors (such as gyroscopes or accelerators), altimeters, orientation sensors, proximity sensors, light sensors, or any other suitable sensor configured to detect an environment of the tracking device 106, a state of the tracking device 106, a movement or location of the tracking device 106, and the like. The sensors 508 are configured to provide information detected by the sensors to the controller 506. The GPS unit 510 is configured to detect a location of the tracking device 106 based on received GPS signals, and is configured to provide detected locations to the controller 506.

Privacy Preservation in a Tracking Device Environment

In some embodiments, a tracking system environment may be configured to facilitate unauthorized tracking device management, including unauthorized tracking device detection and remote handling.

Figure 6:
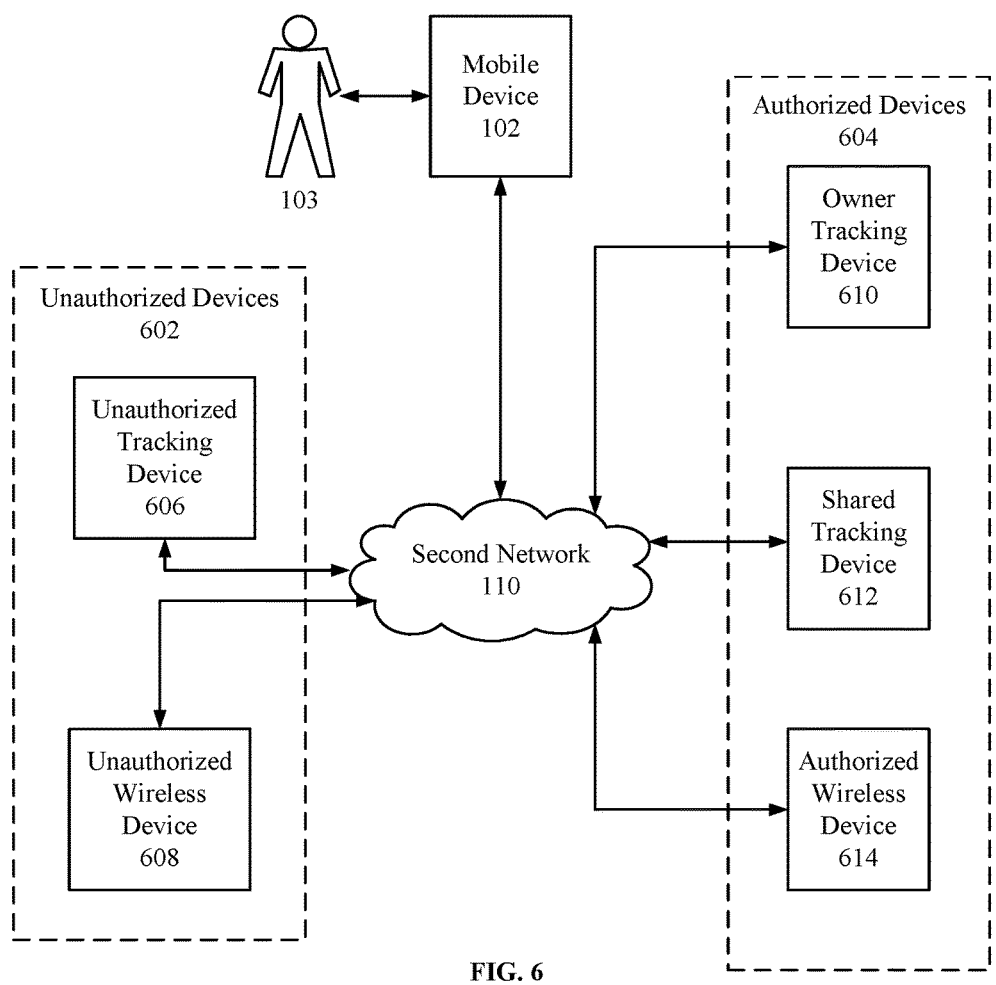
FIG. 6 illustrates an example tracking system environment including unauthorized devices, according to one embodiment.

FIG. 6 illustrates an example tracking system environment including unauthorized devices, according to one embodiment. The environment in FIG. 6 is a local environment of the user 103 carrying the mobile device 102, including the second network 110 and one or more wireless devices connected with the mobile device 102 via the second network 110.

As discussed above, the second network 110 may include a wireless network with a limited communication range, such as a Bluetooth or Bluetooth Low Energy (BLE) wireless network. In one example, the second network 110 is a BLE wireless network having a communication range of approximately 10 meters from the mobile device 102. The second network 110 may include other types of suitable personal area networks capable of wireless communication at a limited communication range such that communication with a wireless device indicates location proximity between the wireless device and the mobile device 102.

The wireless devices connected with the mobile device 102 may include one or more unauthorized devices 602 and one or more authorized devices 604. When an unknown device is detected by the mobile device 102 via the second network, the unknown device may be classified into one of the classes of devices 602-614. Examples of an unauthorized device 602 may include an unauthorized tracking device 606 or other unauthorized (non-tracking) wireless device 608. An authorized device 604 may include an owner tracking device 610, a shared tracking device 612, or other authorized (non-tracking) wireless device 614.

The unauthorized tracking device 608 refers to a tracking device which may be managed by the tracking system 100 (e.g., a "managed tracking device," as used herein), or alternatively, a tracking device managed or associated with a separate system. The unauthorized device 608 refers to a wireless device that is not authorized by the user 103, but has not been identified as a tracking device (e.g., connection qualities indicate low tracking device probability) or has been identified as being a device different from a tracking device (e.g., nearby mobile device of another user).

The owner tracking device 610 refers to a tracking device owned by the user 103. For example, the user 103 may have registered the owner tracking device 610 with the tracking system 100 as the owner or manager of the owner tracking device 610. The shared tracking device 612 refers to a tracking device owned by another user. The shared tracking device 612 may be associated with the user 103, such as based on the owner of the shared tracking device 612 being a connected user of the user 103. The authorized wireless device 614 refers to a non-tracking device that is authorized by the user 103.

In some embodiments, authorized devices may be stored to facilitate device identification. For example, each authorized device may be associated with a unique device identifier that is stored at the tracking system 100 (e.g., at tracker database 212). The mobile device 102 may be configured to scan, listen for, or otherwise detect wireless devices within the communicable range of the mobile device 102. In some embodiments, unique identifiers associated with known unauthorized devices may additionally or alternatively be stored to facilitate device identification.

As discussed above in connection with FIG. 1, the mobile device 102 is connected with the tracking system 100 via the first network 108. The wireless devices 602/604 are connected with the mobile device 102 via the second network 110. Thus, the mobile device 102 may serve as intermediary for communications between a tracking device 106 and the tracking system 100 (e.g., even when the tracking device 106 supports only short range wireless communication). In some embodiments, the tracking system 100 may be configured to remotely control tracking devices 106, such as the activation or deactivation of managed tracking devices, based on sending an instruction to the tracking devices 106. The instruction may be provided directly to the tracking device or through the mobile device 102, such as via the first network 108, the mobile device 102, the second network 110, and then to the tracking device 106.

Figure 7:
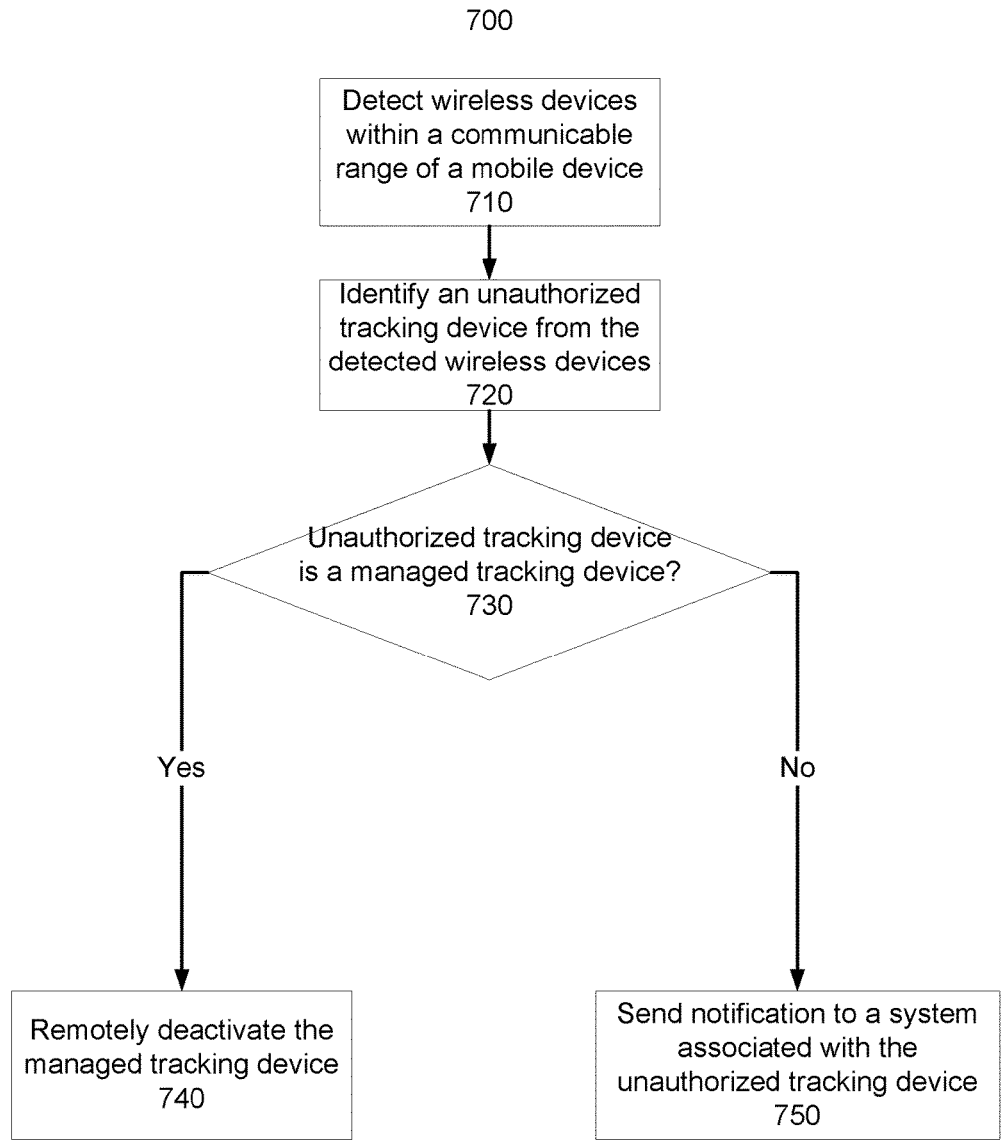
FIG. 7 illustrates a process for managing unauthorized tracking devices, according to one embodiment.

FIG. 7 illustrates a process 700 for managing unauthorized tracking devices, according to one embodiment. Process 700 may be performed within the tracking system environments shown in FIGS. 1 and 6 to enable a user to detect and prevent unauthorized tracking devices. Process 700 is primarily discussed with respect to a central system configuration, where an unauthorized tracking device manager 218 of the tracking system 100 is configured to perform remote management of tracking devices 106 for a mobile device 102. However, in a local configuration, some or all of the functionality may be performed by the tracking manager 308 of the mobile device 102.

At 710, the mobile device 106 may be configured to detect wireless devices within a communication range of the mobile device 106. The mobile device 102 may be configured to scan, listen for, or otherwise detect wireless devices within the communicable range of the mobile device 102 using the second network 110. The wireless devices may include unauthorized devices, authorized devices, or unknown devices without a classification. Some of the wireless devices, whether authorized or unauthorized, may be tracking devices.

The mobile device 102 and the wireless devices may be configured to transfer communication signals. In some embodiments, a communication signal may include a device identifier or other unique identifier associated with the wireless device. If the wireless device is a tracking device 106, the tracking device 106 may store the device identifier in a memory, and broadcast the device identifier to nearby mobile devices 102 (e.g., as a beacon at regular intervals). The mobile device 102 may be configured to receive the device identifiers of connected wireless devices, and transmit the device identifiers to the tracking system 100.

At 720, the tracking system 100 (e.g., the unauthorized tracking device manager 218) may be configured to identify an unauthorized tracking device from the detected wireless devices. Identification of an unauthorized tracking device may include determining, from the pool of detected wireless devices, a wireless device that is both unauthorized and exhibiting communication signal or connection characteristics that indicate the wireless device is tracking the user. The identification may be based on user input (e.g., device authorization based on registration) and/or programmatic analysis of communication signals between the mobile device 102 and the detected wireless devices. Although various techniques may be used to identify unauthorized tracking devices from unknown wireless devices, an example process 800 is discussed below in connection with FIG. 8.

At 730, the tracking system 100 may be configured to determine whether the unauthorized tracking device is a managed tracking device of the tracking system 100. A managed tracking device refers to a tracking device 106 that is controlled by the tracking system 100. The tracking system 100 may store a managed tracking device list including unique device IDs for managed tracking devices. The device ID of an unauthorized tracking device may be compared with the device IDs of managed tracking devices to determine whether the unauthorized tracking device is a managed tracking device.

In response to determining that the unauthorized tracking device is a managed tracking device, process 700 may proceed to 740, where the tracking system 100 may be configured to remotely deactivate the managed tracking device. After a managed tracking device has been identified, the tracking system 100 may attempt to remotely control the managed tracking device if possible. For example, the tracking device 106 may be configured to provide a security token, password, key or other code that is recognized by the tracking device 106, and causes the tracking device 106 to function in accordance with instructions sent from the tracking system 100.

For an unauthorized tracking device 606 managed by the tracking system 100, the instruction may define a remote deactivation command that prevents the unauthorized tracking device 606 from wirelessly communicating with, listening to, or detecting the mobile device 102. Thus the tracking functionality of the unauthorized tracking device 606 is disabled. Remote commands are not necessarily limited to deactivation. In another example, an instruction may define a remote activation command that enables wireless communication for the tracking device. Deactivation may refer to powering down the tracking device, or deactivation of wireless communication components (e.g., transmitter, receiver, etc.) of the tracking device. In another example, deactivation may include unregistering the unauthorized tracking device 606 for the owner, deactivating mobile device location detection/sharing for the unauthorized tracking device 606, disassociating the unauthorized tracking device 606 with the user profile of the owner, or terminating/suspending the user profile or account of the owner, etc.

In some embodiments, remotely deactivating the managed tracking device may include sending the instruction to the managed tracking device via the mobile device 102. For example, the tracking system 100 may be configured to control the tracking device 106 via the network 108, the mobile device 102, the second network 110, and then the tracking device 106.

In some embodiments, remotely deactivating the managed tracking device may include sending the instruction to the managed tracking device via a community mobile device 104 separate from the mobile device 102. For example, the tracking system 100 may be configured to control the tracking device 106 by communicating with the community mobile device 104 via the first network 108, and the community mobile device 104 may communicate with the tracking device 106 via the first network 108, the mobile device 102, the second network 110, and then the tracking device 106. For example, the community device 104 may own or be associated with the tracking device 106, and may be used to provide a security code or the like to deactivate the tracking device 106.

In some embodiments, the control instructions and/or other communications between the tracking system 100 and the tracking device 106 does not pass through any mobile device 102. For example, the tracking device 106 may directly connect with the tracking system 100 via first network 108.

Returning to 730, in response to determining that the unauthorized tracking device is not a managed tracking device, process 700 may proceed to 750, where the tracking system 100 may be configured to send a notification to a system associated with the unauthorized tracking device. The notification may include a message indicating that the unauthorized tracking device has been identified for tracking the user 103 without authorization, which may trigger remedial action by the system. In some embodiments, the notification may include a request to deactivate to unauthorized tracking device. Method 700 may be repeated to provide tracking device identification and handling for wireless devices detected over time by the mobile device 102.

In some embodiments, the tracking system 100 identifies unauthorized tracking devices tracking a user 103 based on communicating with one or more community wireless devices 104 of other users 105. The community wireless device 104 may provide detection even when the user 103 is not carrying a mobile device 102, or carries the mobile device 102 intermittently. For example, the user 103 can carry an authorized tracking device, such as owner tracking device 610 or shared tracking device 612, for instance, coupled to the user's keys. Continuing with this example, the user can also have an unauthorized tracking device attached to the user or an object that moves with the user. Even if the user does not carry the mobile device 102, the tracking system 100 communicates with one or more community mobile devices 104 of other users 105 to detect wireless signals from the authorized tracking device of the user 103, and wireless signals from the unauthorized tracking device. The tracking system 100 collects tracking data associated with both tracking devices from community wireless devices 104, and detects the close proximity of the tracking devices in multiple locations at different times, resulting in identification of the unauthorized device. The tracking system 100 may send a notification to the mobile device 102 or other computing device of the user 103 when the unauthorized tracking device is detected. The tracking system 100 may remotely deactivate the unauthorized tracking device, or perform other remedial actions.

In some embodiments, a tracking device includes a network connection to the tracking system 100. For example, the tracking device is an authorized tracking device that moves with the user. Using techniques as discussed herein for the mobile device 102, the tracking device may be configured to scan and report tracking data of other wireless devices, including unknown devices which may be unauthorized tracking devices. Tracking devices may identify and remember one another (i.e. via a mesh topology), generate tracking data, and report the tracking data to the tracking system 100 via the network 108.

Figure 8:
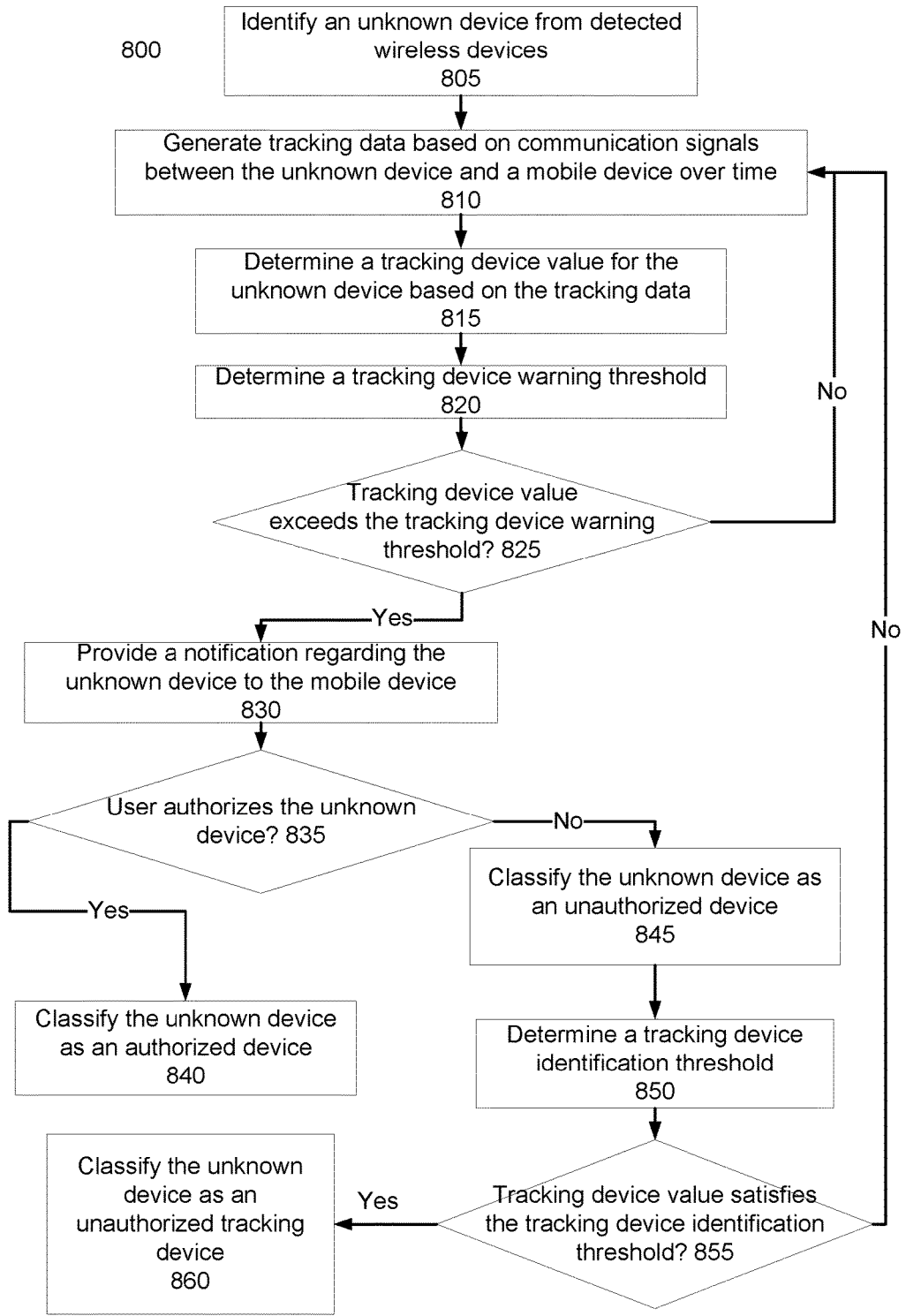
FIG. 8 illustrates a process for identifying an unauthorized tracking device, according to one embodiment.

FIG. 8 illustrates a process 800 for identifying an unauthorized tracking device, according to one embodiment. Method 800 may be performed at 720 of method 700 to identify unauthorized tracking devices from unknown wireless devices detected by the mobile device 102. It should be noted that although reference is made herein to the performance of the process 800 by the tracking system 100, in some embodiments, the process can be performed by a mobile device or other suitable device.

At 805, the tracking system 100 may be configured to identify an unknown device from a set of wireless devices detected by the mobile device 102. Identification of the unknown device may be performed by referencing a listing of known devices accessible to the tracking system 100. Known devices may include authorized devices and unauthorized devices.

Device authorization may be predefined, such as by referencing an authorized device list and/or unauthorized device list. The known device list(s) may be stored and compared with received device IDs of detected wireless devices to determine whether the wireless devices associated with the received device IDs are known devices. A wireless device that fails to include a known device ID, may be determined as an unknown device. Various types of devices may be defined as authorized devices, such as owner tracking device 610, shared tracking device 612, or authorized wireless device 614. The tracking system 100 may be configured to determine that a wireless device fails to be a known device, and thus classifies the device as an unknown device.

In some embodiments, known devices may include shared tracking devices 612 owned by other users. Such devices may be identified by on querying an associated user (e.g., friend, connection, etc.) of the user 103 from the user database 210, identifying the owner tracking device of the associated user, and determining that the owner tracking device of the associated user is a shared tracking device 612 of the user 103.

At 810, the tracking system 100 may be configured to generate tracking data based on communication signals between the unknown device and the mobile device 102 over time. The tracking data represents the connection behavior of the unknown device with respect to the mobile device 102. The mobile device 102 may be configured to communicate with nearby wireless device over time (e.g., polling at time intervals). For each wireless device, the tracking data may indicate a connection status over time between the wireless device and the mobile device 102. Therefore, tracking data may be used to evaluate the characteristics or properties of communication signals, and used to determine whether the wireless device is tracking the user. The tracking data may further include communication signal characteristics, such as signal strength, over time.

At 815, the tracking system 100 may be configured to determine a tracking device value for the unknown device based on the tracking data. The tracking device value refers to a measure of likelihood that the unknown device is behaving like a tracking device 106. The tracking device value may be used as criteria for triggering various unknown device handling tasks. These tasks may include sending warnings or notifications to the mobile device 102 regarding an unknown device, and allowing the user to classify the unknown device as an authorized device or unauthorized device. In another example, a tracking device value indicating a high likelihood of user tracking may trigger programmatic remedial actions, such as deactivation of the unauthorized tracking devices by the tracking system 100.

In some embodiments, the tracking device value may be determined based on the duration of connection between an unknown device and the mobile device 102. For example, an unknown device that has not been previously detected, but has followed the user for several minutes, may indicate a higher likelihood that the unknown device is a tracking device. An unknown device that maintains a connection for only a short period of time, and with no subsequent connections for example, may indicate a lower likelihood that the unknown device is a tracking device.

In some embodiments, the tracking device value may also be determined based on a location data of the mobile device 102. For example, a connection that is maintained while the user is in motion may indicate a higher likelihood that the unknown device is tracking the user (e.g., the device is attached to the user, an object being transported by or transporting the user, etc.). As a user moves around with an attached unauthorized device, the probability that the unauthorized device is being used to track movement or the behavior of an object increases.

In some embodiments, the tracking device value may be determined based on repeated or recurring connections between the unknown device and the mobile device 102. If the unknown device and the mobile device 102 connect at intermittent (e.g., daily, twice a day, etc.) or otherwise at repeated times, this may indicate that the unknown device is a tracking device. For example, a tracking device may be planted on the user's car, and thus becomes detected by the mobile device 102 each time the user is within or near the car. Thus, an unknown device may be more likely to be a tracking device if there are recurring connections.

As discussed in the preceding examples, the tracking device value may be determined based on algorithmic transformations of the tracking data. An algorithmic transformation maps or transforms the tracking data input to a tracking device value. In some embodiments, tracking device values may be determined based on machine learning algorithm. For example, the algorithmic transformation may be generated based on generating training sets (e.g., of ground truth input/output examples), and applying the training sets to a neural network to generate a trained neural network model. The neural network model relates the tracking data input to an output tracking device value. A tracking device value for an unknown device may be determined based on applying input tracking data to the trained neural network model, and receiving a tracking device value as an output.

In some embodiments, the tracking data of the unknown device is generated by one or more community mobile devices 104 of other users 105. Here, the user 103 that is being tracked is not required to carry the mobile phone 102 to receive unauthorized tracking device detection services from the tracking system 100. For example, the user carries an authorized tracking device that is detected by community mobile devices 104. If the user is also being tracked by an unauthorized tracking device, the community mobile devices 104 also detect the unauthorized tracking device. The community mobile devices 104 generate tracking data representing the connection behavior of the unknown device and an authorized tracking device of the user 103. The tracking data is wirelessly detected by the one or more community mobile devices 104 of other users 105. For example, different community mobile devices 104 may detect wireless signals from both the unknown device and the authorized tracking device of the user 103 over time, and at different locations. The tracking system 100 may be configured to determine a tracking device value for the unknown device relative to the authorized tracking device based on the tracking data generated by the community mobile devices 104. For example, tracking data that indicates the close proximity of the authorized tracking device and the unknown device at multiple locations and at different times may indicate a higher likelihood that the unknown device is behaving like a tracking device with respect to the user.

At 820, the tracking system 100 may be configured to determine a tracking device warning threshold. The tracking device warning threshold defines a minimum likelihood that an unknown device is a tracking device for the unknown device to be of further interest. Put another way, communication signals that fail to exceed the tracking device warning threshold are sufficiently likely associated with non-tracking devices (e.g., wireless devices of others that happen to enter the communication range of the mobile device 102), and thus no user notification or other tracking device handling is required.

The tracking device warning threshold may define a minimum likelihood that a wireless device is a tracking device that is needed to initiate an alert to the user 103 regarding the wireless device. The alert may allow the user to provide a classification for the unknown device as authorized or unauthorized.

At 825, the tracking system 100 is configured to determine whether the tracking device value of the unauthorized device exceeds the tracking device warning threshold.

The tracking device warning threshold may be set at a low value to provide more frequent warnings with higher probability of a false positive (e.g., a non-tracking device identified as tracking device). In contrast, the tracking device warning threshold may be set at a high value to provide less frequent warnings, but with a higher possibility of a false negative (e.g., a tracking device that fails to be identified as a tracking device until significant tracking activity has already occurred). In some embodiments, the tracking device warning threshold may correspond with the tracking data indicating that a wireless device was not previously detected, and then maintained a connection for at least a predefined time (e.g., 10 minutes). As such, when tracking data of a wireless device satisfies such characteristics, the tracking data can be determined to exceed the device warning threshold.

In response to determining that the tracking device value fails to exceed the tracking device warning threshold, process 800 may return to 810, where additional tracking data may be generated based on communication signals between the unknown device and the mobile device 102. The additional tracking data may then be used to determine tracking device values, and so forth. Thus the tracking device value of a wireless device is subject to update over time to facilitate continuous monitoring for unknown devices.

Returning to 825, in response to determining that the tracking device value exceeds the tracking device warning threshold, process 800 may proceed to 830, where the tracking system 100 may be configured to provide a notification regarding the unauthorized device to the mobile device.

The notification may include a message or other indication that the unknown device has been detected by the mobile device 102, and has been flagged as a potential tracking device. The notification may include a user interface that facilitates user management of the unknown device. For example, the user interface may allow the user to classify the unknown device as an authorized device or unauthorized device. The mobile device 102 identifies the unknown device, and notifies the user of the mobile device of a presence of the unknown device.

The notification may further include various informational displays that facilitate user management for the unknown device. For example, the notification may include a list of wireless devices connected with the mobile device 102. The wireless devices may be identified based on device ID, device name, or other unique identifier. The list may include status indications for each wireless device indicating device status such as whether the wireless device is authorized, whether the device is a tracking device, and tracking device type (e.g., owner, shared, unauthorized, etc.). In some embodiments, the notification may further include a graph or other graphical representation of tracking data. For example, the graph may include tracking device values and/or connection signal strength as a function of time. Informational displays may also be provided to the display of the mobile device based on user request (e.g., even if no tracking device warning threshold has been exceeded).

At 835, the tracking system 100 may be configured to determine whether the user 103 authorizes the unknown device. The determination may be based on a user generated message or user input provided in response to the notification at 830. The mobile device 102 receives a confirmation from the user that the unknown device is an authorized or unauthorized device. In response to receiving the confirmation from the user, the mobile device 102 provides an indication that the unknown device is an authorized or unauthorized device to the central tracking system 100, where it is classified accordingly.

In response to determining that the user 103 authorizes the unknown device, method 800 may proceed to 840, where the tracking system 100 may be configured to classify the unknown device as an authorized device. For example, the device ID of the unknown device may be stored in an authorized device list. As such, the authorized device is not identified as an unknown device at 805 for subsequent connections of the authorized device with the mobile device 102.

Returning to 835, in response to determining that the user 103 does not authorize the unknown device, or in response to an explicit classification of the device as suspicious or unauthorized by the user, method 800 may proceed to 845, where the tracking system 100 may be configured to classify the unknown device as an unauthorized device. For example, the device ID of the unknown device may be stored in an unauthorized device list. As such, the unauthorized device is not identified as an unknown device at 805 for subsequent connections of the unauthorized device with the mobile device 102.

At 840, the tracking system 100 may be configured to determine a tracking device identification threshold for the unauthorized device. The tracking device identification threshold defines a minimum tracking device value needed to identify and classify a wireless device as a tracking device. The tracking device identification threshold may be a higher level threshold than the tracking device warning threshold discussed at 820. Put another way, tracking data for some devices may be sufficiently characteristic of a tracking device to issue a user notification (e.g., higher than minimum 10% likelihood threshold), but insufficient to identify the device as being a tracking device with higher level certainty (e.g., 50% likelihood or greater).

The tracking device identification threshold and tracking device warning threshold are two examples of threshold values that may be applied to tracking device values. In various embodiments, more or fewer threshold values may be used. For example, a single threshold value may be used that triggers user notification, and identification as a tracking device. Here, unknown tracking devices may be identified from wireless devices within communication range of the mobile device. The user may be notified of presence of the unknown tracking device, and may classify the unknown tracking device as being authorized or unauthorized as discussed above.

Each threshold value may be associated with different functionality and handling, ranging from a low intervention for low threshold value satisfaction (e.g., warning a user) to a high intervention for high threshold value satisfaction (e.g., deactivating a tracking device). In some embodiments, the tracking device warning threshold and/or tracking device identification threshold may be set by the user.

At 855, the tracking system 100 may be configured to determine whether the tracking device value for the unauthorized device exceeds the tracking device identification threshold. For example, if a larger tracking device value corresponds with a higher likelihood of being a tracking device, then the tracking device value may be determined to exceed the tracking device identification threshold if the tracking device value exceeds the tracking device identification threshold.

In response to determining that the tracking device value fails to exceed the tracking device identification threshold, process 800 may return to 810, where additional tracking data may be generated based on communication signals between the unauthorized device and the mobile device 102, and determine tracking device values based on the communication signals.

Returning to 855, in response to determining that the tracking device value exceeds the tracking device identification threshold, process 800 may proceed to 860, where the tracking system 100 may be configured to identify and classify the unauthorized device as an unauthorized tracking device. As such, tracking device values and thresholds may be used to identify tracking devices from the wireless devices that are detected by the mobile device 102. In response to the unauthorized device being identified as an unauthorized tracking device, various remedial actions may be performed as discussed at 740-760 of process 700.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Any of the devices or systems described herein can be implemented by one or more computing devices. A computing device can include a processor, a memory, a storage device, an I/O interface, and a communication interface, which may be communicatively coupled by way of communication infrastructure. Additional or alternative components may be used in other embodiments. In particular embodiments, a processor includes hardware for executing computer program instructions by retrieving the instructions from an internal register, an internal cache, or other memory or storage device, and decoding and executing them. The memory can be used for storing data or instructions for execution by the processor. The memory can be any suitable storage mechanism, such as RAM, ROM, flash memory, solid state memory, and the like. The storage device can store data or computer instructions, and can include a hard disk drive, flash memory, an optical disc, or any other suitable storage device. The I/O interface allows a user to interact with the computing device, and can include a mouse, keypad, keyboard, touch screen interface, and the like. The communication interface can include hardware, software, or a combination of both, and can provide one or more interfaces for communication with other devices or entities.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for managing unauthorized tracking devices, comprising:
   detecting, by a mobile device, one or more wireless devices within a communication range of the mobile device;
   identifying, by the mobile device, a detected wireless device as an unknown tracking device based on:
      generating, by the mobile device, tracking data based on communication signals between the detected wireless device and the mobile device over time;
      determining, by the mobile device, a tracking device value for the detected wireless device based on the tracking data, the tracking device value being determined based on at least a duration of a connection between the detected wireless device and the mobile device, and indicating a likelihood that the detected wireless device is a tracking device; and
      determining, by the mobile device, whether the tracking device value exceeds a tracking device warning threshold;
   in response to determining that the tracking device value exceeds the tracking device warning threshold, notifying, by the mobile device, a user of the mobile device of a presence of the unknown tracking device, wherein notifying the user includes sending a request for a confirmation from the user of the mobile device that the unknown tracking device should be classified as an unauthorized device; and
   in response to receiving the confirmation from the user of the mobile device that the unknown tracking device is an unauthorized device, providing, by the mobile device, an indication that the unknown tracking device is an unauthorized tracking device to a central tracking system, the central tracking system configured to classify the unknown tracking device as an unauthorized tracking device.

2. The method of claim 1, further comprising:
   in response to receiving a confirmation from the user of the mobile device that the unknown tracking device is an authorized tracking device, providing, by the mobile device, an indication that the unknown tracking device is an authorized tracking device to the central tracking system, the central tracking system configured to classify the unknown tracking device as an authorized tracking device.

3. The method of claim 1, further comprising
   in response to determining that the tracking device value exceeds the tracking device identification threshold, identifying, by the mobile device, the detected wireless device as the unknown tracking device.

4. The method of claim 1, wherein identifying the detected wireless device as the unknown tracking device comprises:
   receiving, by the mobile device, a device identifier associated with the detected wireless device; and
   comparing, by the mobile device, the device identifier with device identifiers associated with known authorized devices or known unauthorized devices.

5. The method of claim 4, wherein at least one known authorized device comprises a tracking device belonging to the user or a tracking device shared with the user.

6. The method of claim 1, further comprising:
   receiving, by the mobile device from the central tracking system, an instruction for remotely deactivating the unauthorized tracking device; and
   providing, by the mobile device, the instruction to the unauthorized tracking device.

7. The method of claim 1, further comprising providing, by the central tracking system, an instruction for deactivating the unauthorized tracking device directly to the unauthorized tracking device.

8. The method of claim 1, further comprising, in response to the unknown tracking device being classified as the unauthorized tracking device, requesting, by the mobile device, the central tracking system to remotely deactivate the unauthorized tracking device via a community mobile device different from the mobile device.

9. The method of claim 1, wherein detecting the one or more wireless devices within the communication range of the mobile device comprises receiving, by the mobile device, communication signals from the one or more wireless devices via a Bluetooth wireless network.

10. A mobile device for managing unauthorized tracking devices, the mobile device comprising a wireless transceiver and a hardware processor configured to:
    detect one or more wireless devices within a communication range of the mobile device;
    identify a detected wireless device as a unknown tracking device based on:
       generating tracking data based on communication signals between the detected wireless device and the mobile device over time;
       determining a tracking device value for the detected wireless device based on the tracking data, the tracking device value being determined based on at least a duration of a connection between the detected wireless device and the mobile device, and indicating a likelihood that the detected wireless device is a tracking device; and determining, by the mobile device, whether the tracking device value exceeds a tracking device warning threshold;

in response to determining that the tracking device value exceeds the tracking device warning threshold, notify a user of the mobile device of a presence of the unknown tracking device by sending a request for a confirmation from the user of the mobile device that the unknown tracking device should be classified as an unauthorized device; and in response to receiving the confirmation from the user of the mobile device that the unknown tracking device is an unauthorized device, provide an indication that the unknown tracking device is an unauthorized tracking device to a central tracking system, the central tracking system configured to classify the unknown tracking device as an unauthorized tracking device.

11. The mobile device of claim 10, wherein the hardware processor is further configured to:

notify the user of the mobile device of a presence of a second unknown tracking device;

in response to receiving a confirmation that the second unknown device is an authorized device, provide an indication that the second unknown tracking device is an authorized device to the central tracking system, the central tracking system configured to classify the second unknown tracking device as an authorized device.

12. The mobile device of claim 10, wherein the hardware processor is further configured to, in response to determining that the tracking device value exceeds the tracking device identification threshold, identify the detected wireless device as the unknown tracking device.

13. The mobile device of claim 10, wherein the hardware processor configured to identify the detected wireless device as the unknown tracking device includes the hardware processor being configured to identify the detected wireless device as an unknown device based on:

receiving a device identifier associated with the detected wireless device; and comparing the device identifier with device identifiers associated with known authorized devices or known unauthorized devices.

14. The mobile device of claim 13, wherein at least one known authorized device comprises an owner tracking device or a shared tracking device.

15. The mobile device of claim 10, wherein the hardware processor is further configured to:

receive, from the central tracking system, an instruction for remotely deactivating the unauthorized tracking device; and provide the instruction to the unauthorized tracking device.

16. The mobile device of claim 10, wherein the central tracking system is configured to provide an instruction for deactivating the unauthorized tracking device directly to the unauthorized tracking device.

17. The mobile device of claim 10, wherein the hardware processor is further configured to, in response to the unknown tracking device being classified as the unauthorized tracking device, request the central tracking system to remotely deactivate the unauthorized tracking device via a community mobile device different from the mobile device.

18. The mobile device of claim 10, wherein the hardware processor configured to detect the one or more wireless devices within the communication range of the mobile device includes the hardware processor being configured to receive communication signals from the one or more wireless devices via a Bluetooth wireless network.

* * * * *